United States Patent [19]

Yeoman

[11] Patent Number: 4,652,206

[45] Date of Patent: Mar. 24, 1987

[54] WIND TURBINE

[76] Inventor: David R. Yeoman, 869 Concourse Village West, Bronx, N.Y. 10451

[21] Appl. No.: 717,823

[22] Filed: Mar. 29, 1985

[51] Int. Cl.[4] .............................................. F03D 7/06
[52] U.S. Cl. ......................................... 415/4; 416/41
[58] Field of Search ...................... 415/2 R, 3 R, 4 R; 416/41

[56] References Cited

U.S. PATENT DOCUMENTS

| | | | |
|---|---|---|---|
| 14,997 | 6/1856 | Battey | 415/2 R |
| 143,100 | 9/1873 | Sheplar et al. | 415/2 R |
| 201,400 | 3/1878 | Everhart | 415/3 R |
| 535,193 | 3/1895 | Chapman | 415/4 R |
| 600,893 | 3/1898 | Schmucker | 415/3 R |
| 993,120 | 5/1911 | Sterner | 415/3 R |
| 1,523,295 | 1/1925 | Ryan | 415/3 R |
| 1,615,675 | 1/1927 | Bender | 415/2 R |
| 1,820,818 | 8/1931 | McRae | 415/4 R |
| 1,935,097 | 11/1933 | Nelson | 415/3 R |
| 4,571,152 | 2/1986 | Tatar | 415/4 |

FOREIGN PATENT DOCUMENTS

| | | | |
|---|---|---|---|
| EP83318 | 7/1983 | European Pat. Off. | 415/2 R |
| 821930 | 11/1951 | Fed. Rep. of Germany | 415/4 R |
| 1916460 | 10/1970 | Fed. Rep. of Germany | 415/3 R |
| 2460075 | 7/1976 | Fed. Rep. of Germany | 415/3 R |
| 3000089 | 7/1981 | Fed. Rep. of Germany | 415/2 R |
| 575173 | 7/1924 | France | 415/3 R |
| 595500 | 10/1925 | France | 415/4 R |
| 930255 | 1/1948 | France | 415/2 R |
| 2286955 | 4/1976 | France | 415/3 R |
| 43047 | 4/1977 | Japan | 415/2 R |
| 162277 | 12/1981 | Japan | 415/3 R |
| 647929 | 12/1950 | United Kingdom | 415/3 R |

Primary Examiner—Everette A. Powell, Jr.
Attorney, Agent, or Firm—Steinberg & Raskin

[57] ABSTRACT

A vertical axis wind turbine includes a pair of wind deflectors for directing the wind current into the rotor assembly. The wind deflectors are connected to the wind turbine so that their positions are automatically adjusted as a function of wind velocity as well as wind direction to maximize efficiency. The wind deflectors automatically move to a position downwind of the rotor assembly during periods of unusually high wind velocity and actuate a rotational governor which increases the angular inertia of the turbine to limit the speed of the turbine shaft during such high wind conditions.

12 Claims, 11 Drawing Figures

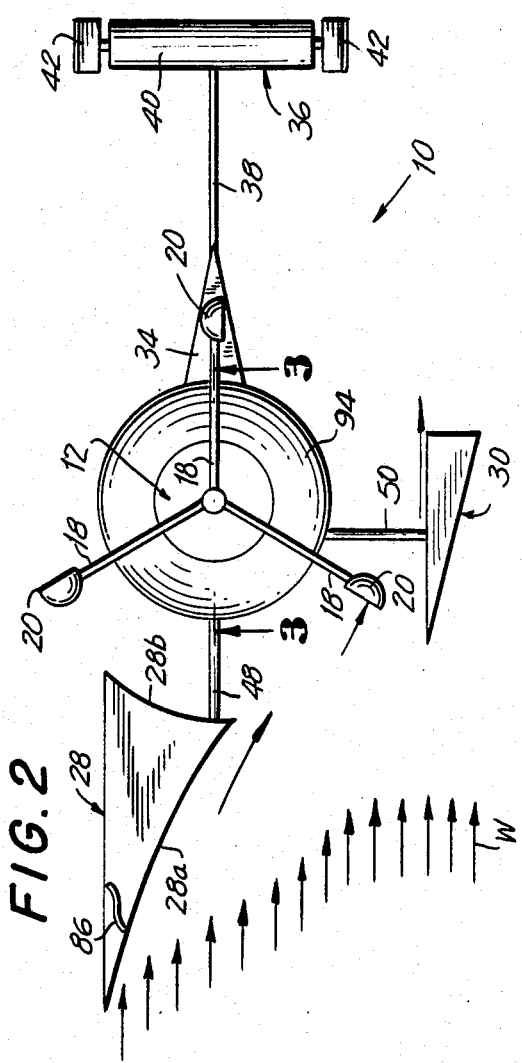
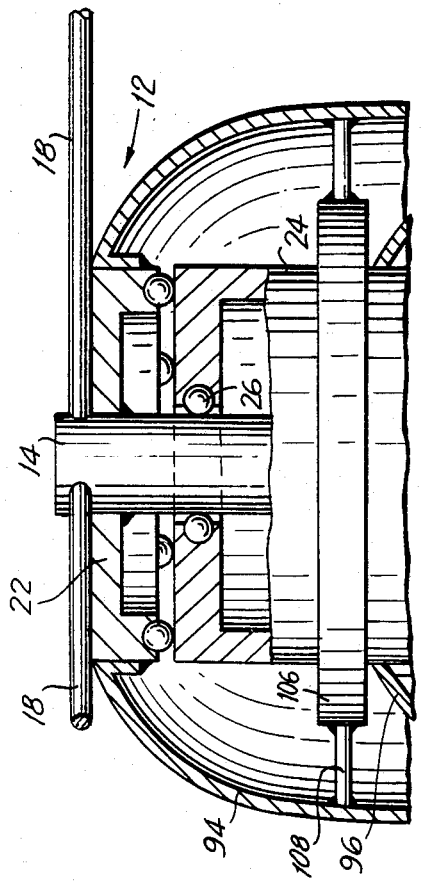
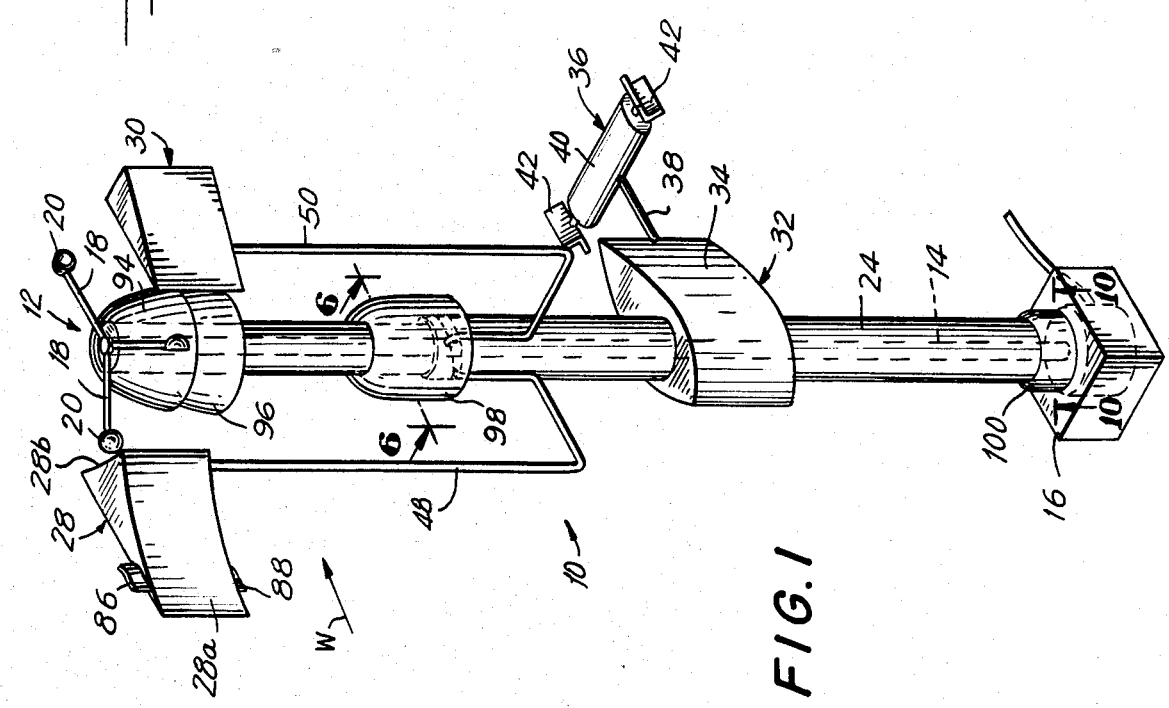

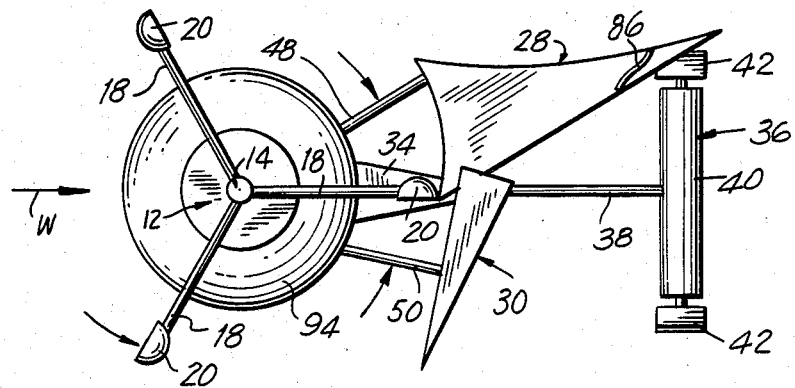
FIG.4
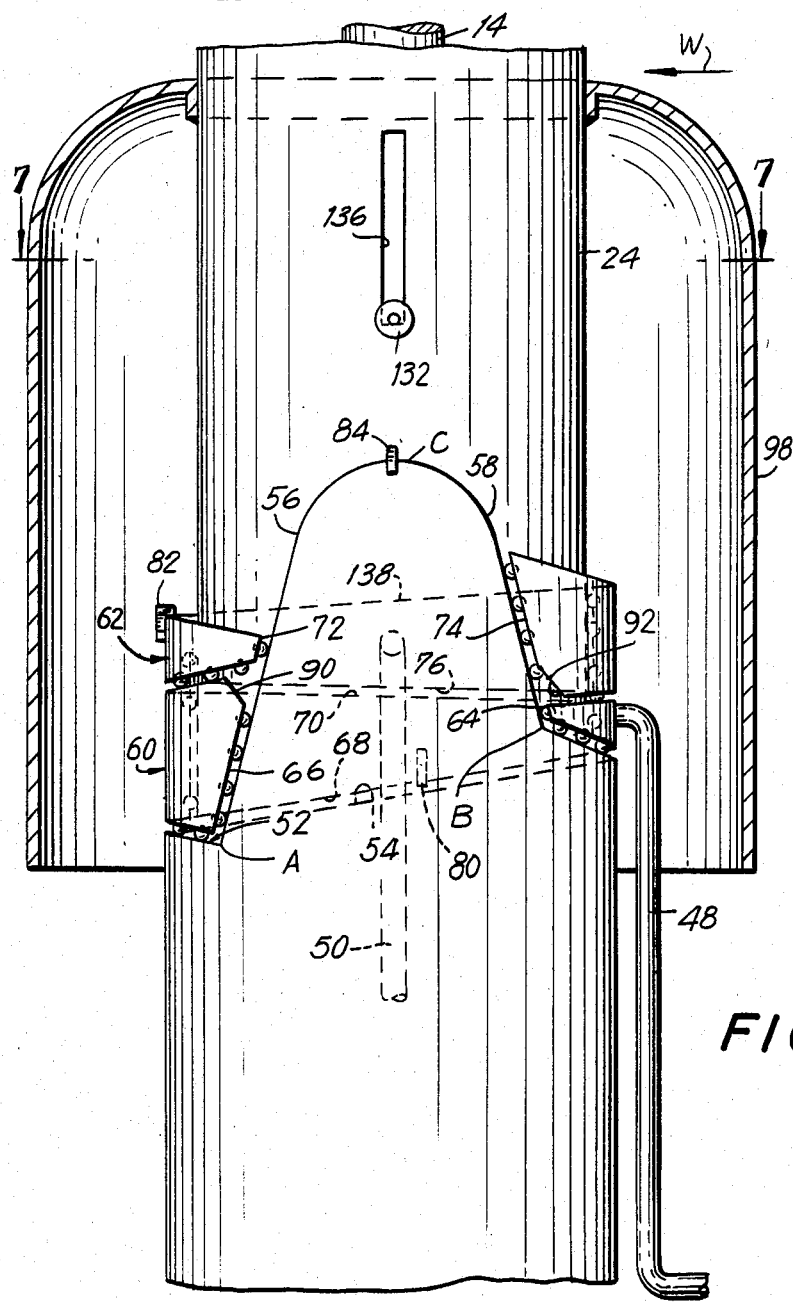
FIG.5
FIG.6

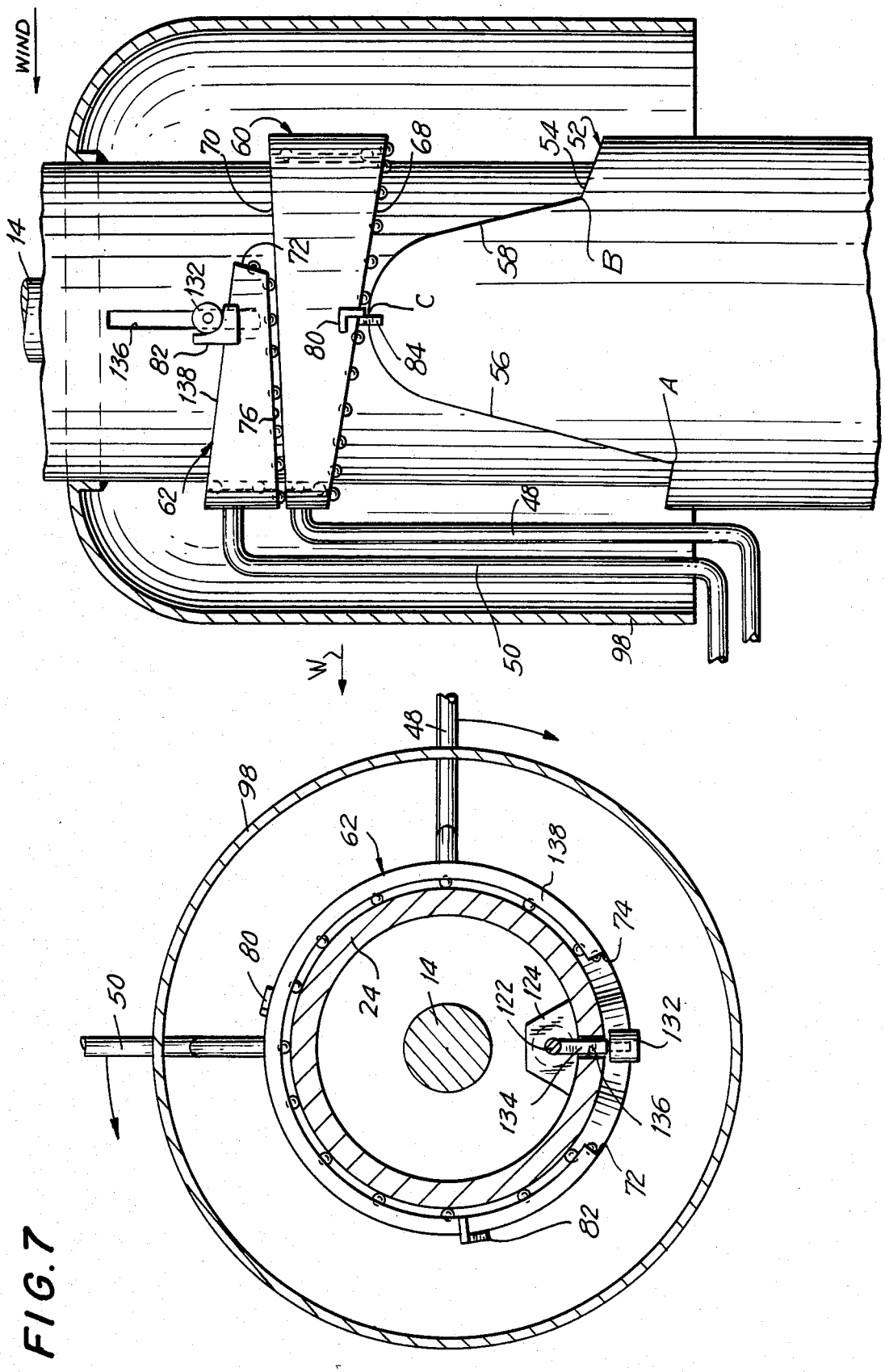

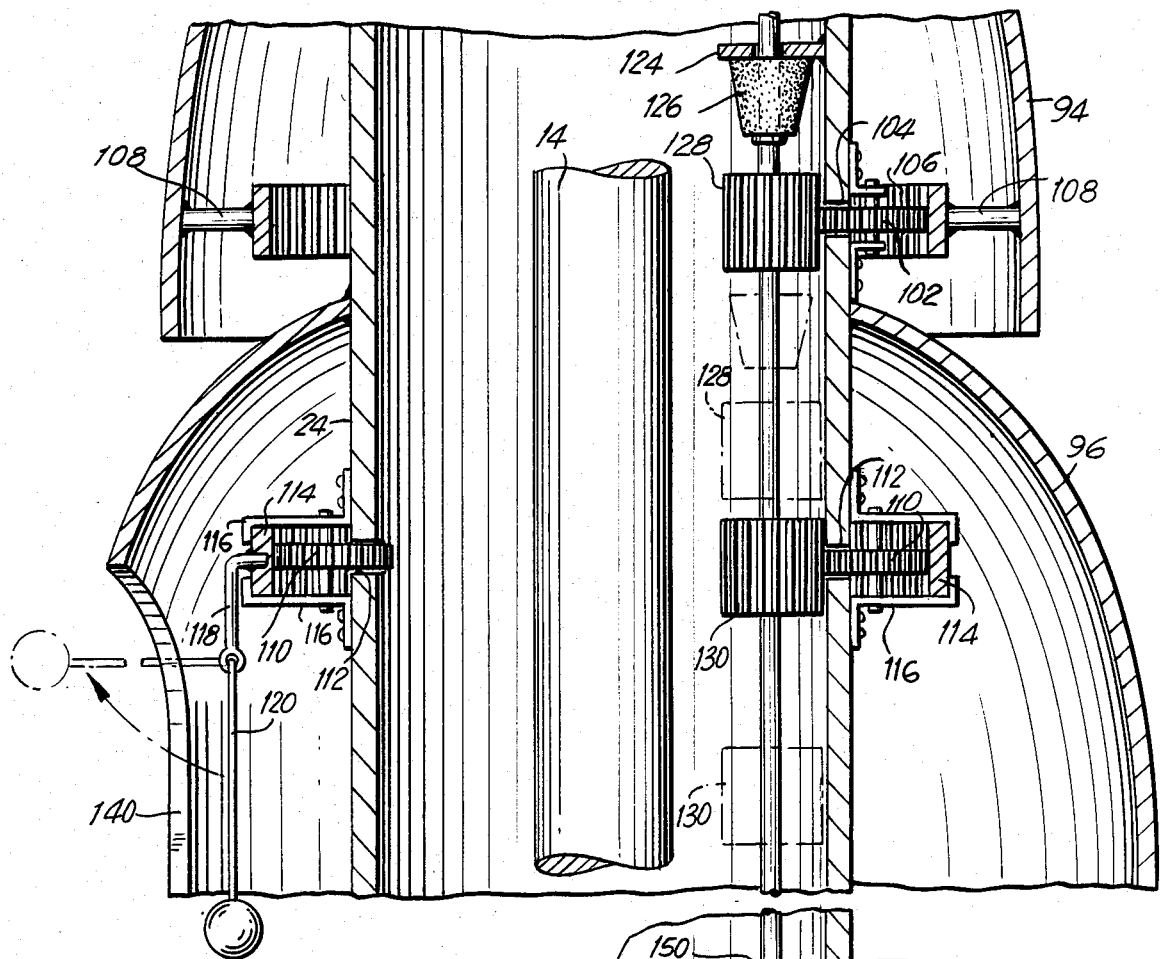
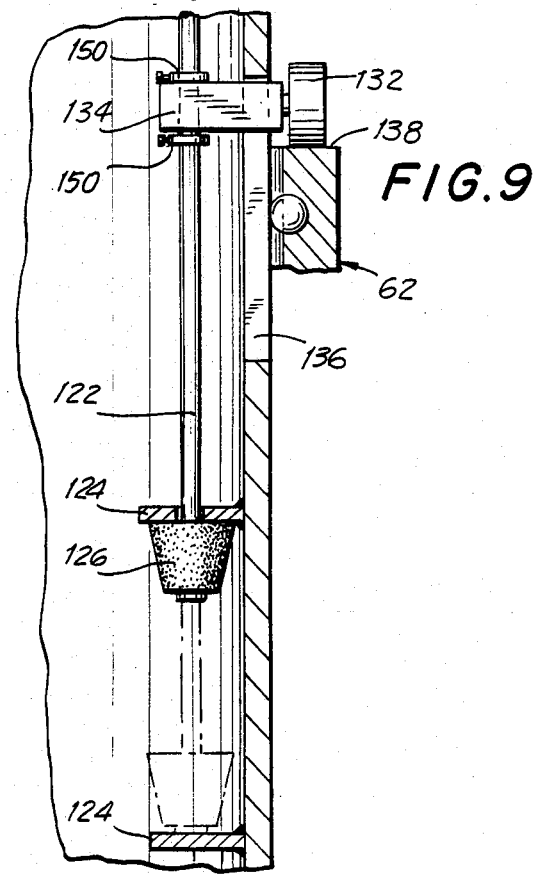
FIG. 9
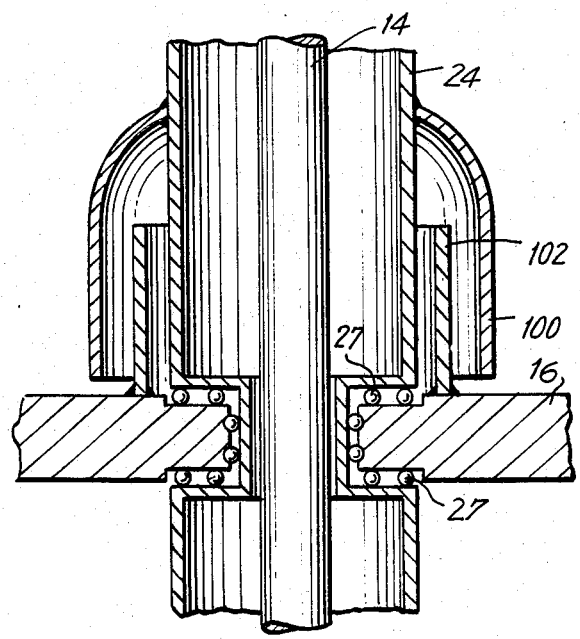
FIG. 10

WIND TURBINE

BACKGROUND OF THE INVENTION

This invention relates generally to wind power machines and, more particularly, to wind turbines.

Efforts to develop efficient wind turbines for converting wind energy into electrical energy have increased dramatically. Generally, a wind turbine includes a rotor assembly mounted for rotation about either a horizontal or vertical axis, a turbine shaft coupled to the rotor assembly and an electric generator or alternator driven by the shaft to generate electric power.

Conventional wind turbines are often provided with certain features in order to improve efficiency. For example, a wind vane may be provided for turning a horizontal axis rotor assembly into the wind in the case where wind direction changes during operation. A wind deflector may be provided upwind of a vertical axis rotor assembly in order to direct the wind current into the wind-receiving elements of the rotor assembly. In this connection reference is made to U.S. Pat. No. 3,970,409 which discloses a vertical axis wind turbine which includes a rudder connected to a wind deflector by an arm which is pivotally mounted to the turbine shaft so that the wind deflector position is automatically adjusted upon changes in wind direction to provide maximum effectiveness.

One problem for which a solution has not as yet been found is to constantly maximize efficiency of a wind turbine for all working wind velocities. In the case of horizontal axis wind turbines, rotor rotation has been controlled by turning the rotor blades gradually into and out of the wind or tilting the blades forward and rearward or turning the blades edgewise into the wind and back. Another problem is to prevent damage to the wind turbine when unusually high wind velocities occur, such as during hurricanes or squalls. For example, if the turbine rotates too fast under high wind conditions, stress and fatigue can damage the rotor assembly, drive shaft, and gear box, or burn out the generator. These problems have not been satisfactorily solved.

SUMMARY OF THE INVENTION

Accordingly, one object of the present invention is to provide a new and improved vertical axis wind turbine.

Another object of the present invention is to provide a new and improved vertical axis wind turbine including a wind deflector assembly for directing the wind current into the rotor assembly.

Still another object of the present invention is to provide a new and improved vertical axis wind turbine which includes a wind deflector assembly which is automatically adjustable as a function of wind velocity as well as wind direction to maximize efficiency of the wind turbine.

A further object of the present invention is to provide a new and improved vertical axis wind turbine which includes a wind deflector assembly for directing the wind current into the rotor assembly which automatically moves to a position downwind of the rotor assembly during periods of unusually high wind velocity and which automatically returns to its normal operating position upon abatement of the high wind condition.

A still further object of the present invention is to provide a new and improved vertical axis wind turbine which includes a rotational governor assembly which increases the angular inertia of the turbine to limit the speed of the turbine shaft during periods of unusually high wind velocity.

Briefly, in accordance with the present invention these and other objects are attained by providing a vertical axis wind turbine with a first wind deflector normally positioned so as to deflect the wind current into the wind-receiving elements of the rotor assembly and a second wind deflector positioned generally laterally of the rotor assembly to redirect the initially deflected wind current. The first and second deflectors are rotated together into the direction of the wind by means of a vane or rudder and the deflectors act together in the manner of a funnel or shroud to direct the wind into the rotor assembly so as to optimize the efficiency of the wind turbine.

The two wind deflectors are connected to the wind turbine so that their positions are automatically adjusted with respect to each other as a function of wind velocity. As wind speed increases from a first determined value to a second predetermined value, the two deflectors automatically move away from each other to enlarge the space between them to thereby direct greater amounts of air into the wind-receiving elements of the rotor assembly. If wind velocity decreases, the deflectors automatically move closer to each other until reaching their normal positions. Moreover, the connection of the wind deflectors to the wind turbine allows the deflectors to move to a position downwind of the rotor assembly during periods of unusually high wind velocity in excess of a third predetermined value. This creates a substantially "dead air zone" in the region of the rotor assembly which reduces wind speed and slows the rotation of the rotor assembly without completely stopping it. When the high wind condition abates, the two wind deflectors automatically return to their normal positions. When the wind deflectors move to the downwind position, i.e., when the wind velocity reaches the third predetermined value, a rotational governor assembly is actuated to increase the angular inertia of the turbine and limit the speed of the turbine shaft.

DETAILED DESCRIPTION OF THE DRAWINGS

A more complete appreciation of the present invention and many of the attendant advantages thereof will be readily understood by reference to the following detailed description when considered in connection with the accompanying drawings in which:

Fig. 1 is a perspective view of a wind turbine in accordance with the present invention;

FIG. 2 is a top plan view of the wind turbine of FIG. 1;

FIG. 3 is a section view taken along line 3—3 of FIG. 2;

FIG. 4 is a top plan view of the wind turbine of FIG. 1 with the wind deflectors shown in their downwind position under the force of unusually high wind speeds;

FIG. 5 is a perspective view of the connector rings which connect the respective wind deflectors to the outer shaft of the wind turbine;

FIG. 6 is a side elevation view in partial section illustrating the wind deflector connector rings connected to the outer shaft of the wind turbine;

Fig. 7 is a section view taken along line 7—7 of FIG. 6;

FIG. 8 is a view similar to FIG. 6 illustrating the position of the wind deflector connector rings when the wind deflectors are situated in the downwind positions as seen in FIG. 4;

FIG. 9 is a side elevation view in section of the wind turbine and illustrating the rotational governor to limit the speed of the turbine shaft under unusually high wind velocity conditions;

Fig. 10 is a section view taken along line 10—10 of FIG. 1; and

DESCRIPTION OF THE PREFERRED EMBODIMENTS

Figure 11:
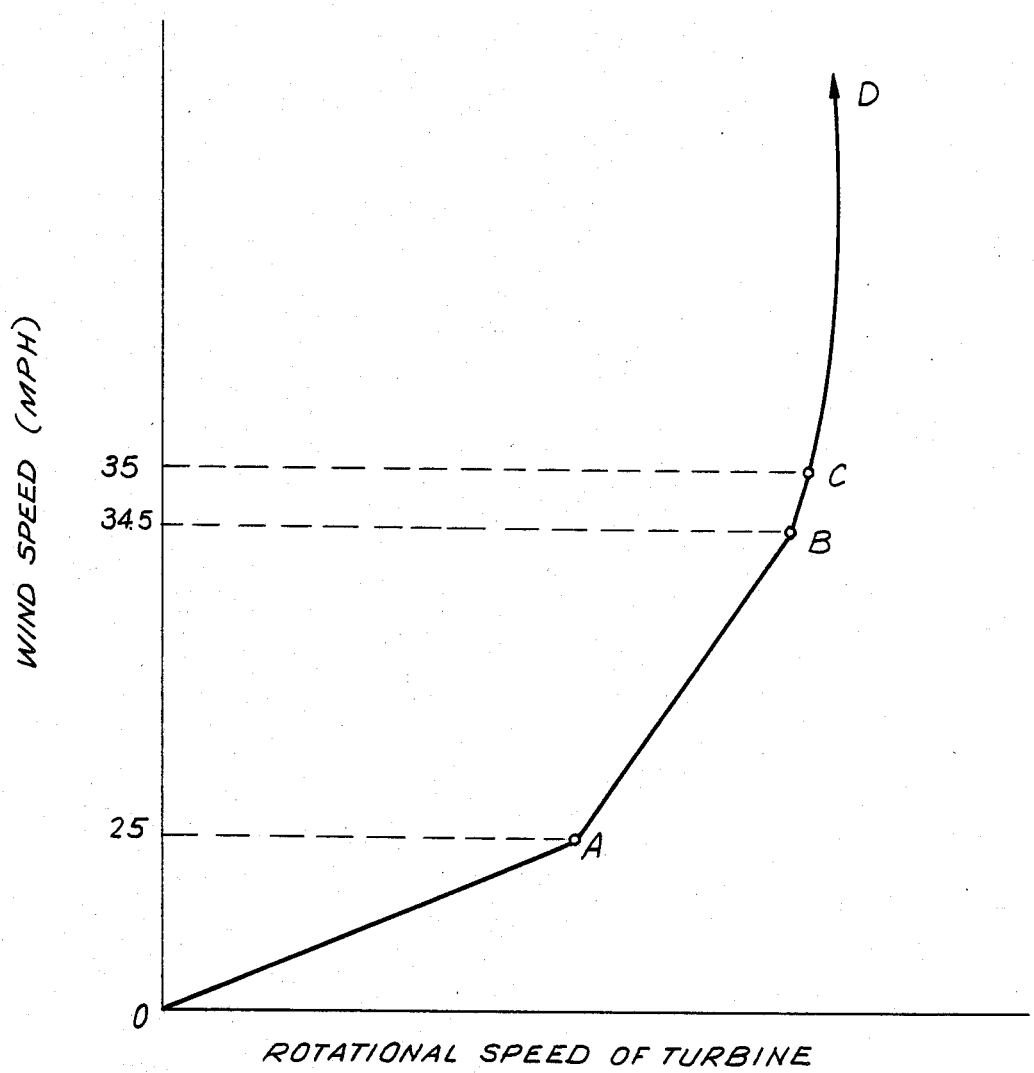
FIG. 11 is a schematic graphical view illustrating a typical relationship between wind speed and the rotational speed of a turbine in accordance with the invention.

Referring now to the drawings wherein like reference characters designate identical or corresponding parts throughout the several views and, more particularly, to FIGS. 1-3 and 10, a wind turbine in accordance with the invention, generally designated 10, includes a vertical axis rotor assembly 12 (FIG. 3) connected to an inner, rotatably mounted drive shaft 14 which is coupled at its lower end to an alternator (not shown) through an appropriate gear transmission situated below a lower platform 16. Any conventional gear transmission may be employed although a so-called "squirm-gear" transmission as described in "Popular Science" of November, 1984 at pages 76-78 is preferred for transmitting the rotation of the inner drive shaft 14 to the alternator.

Rotor assembly 12 includes a plurality (three shown) of radially extending spokes 18 connected at their inner ends to the drive shaft 14. A wind-receiving cup 20 is fixed to the outer end of each spoke 18. As seen in FIG. 3, the rotor assembly 12 is fixed to a hub 22 fixed to drive shaft 14. The hub 22 is supported on ball bearings on the upper surface of an outer hollow shaft 24 through which the inner drive shaft 14 extends coaxially. The inner drive shaft 14 is rotatably mounted at its upper end by a ball bearing 26 provided within an opening at the top of the outer shaft 24 and at its lower end by a ball bearing (not shown) situated below platform 16.

The outer shaft 24 is mounted by ball bearings 27 (FIG. 10) in lower platform 16 for 360° rotation and serves to support first and second wind deflectors 28 and 30 in a manner described below. A vane assembly 32 is fixed to outer shaft 24 and functions to rotate the outer shaft 24 and wind deflectors 28 and 30 connected thereto until the wind deflectors are appropriately positioned so as to direct the wind into the cups 20, also as described below. The vane assembly 32 includes a stabilizing vane or rudder 34 connected to outer shaft 24 and a tail assembly 36 connected to the trailing edge of the vane 34 by an arm 38. Tail assembly 36 includes a horizontal bar 40 having an airfoil configuration and a pair of stabilizing winglets 42. The airfoil shape of bar 40 provides a lifting force as wind travels over it which is transmitted through bar 38 and vane 34 to the outer shaft 24 to reduce the load on bearings 26 and 27.

Referring to FIGS. 1 and 2, first and second wind deflectors 28 and 30 are connected to the outer shaft 24 by respective arms 48 and 50. As best seen in FIG. 2, when the vane assembly rotates the outer shaft 24 into the wind, the first wind deflector 28 is normally positioned forwardly and to one side of the rotor assembly 12 so that its surface 28a directs the wind, designated by arrows W in FIG. 2, into the cups 20. The first wind deflector 28 is balanced so as to remain stable as it directs the wind into cups 20. The rear surface 28b of wind deflector 28 is preferably curved as seen in FIG. 2 to permit the cups 20 to pass in close proximity thereto. This results in a slight underpressure or dead air zone developing in the region immediately downwind of surface 28b which enhances the rotation of rotor assembly 12.

The second wind deflector 30, also appropriately balanced, is located at the other side of the rotor assembly and redirects the wind, initially directed by first wind deflector 28, into the cups 20 instead of past them for maximum energy gain. The first and second wind deflectors 28 and 30 are normally positioned as illustrated in FIGS. 1 and 2 and act together in the manner of a funnel or shroud to direct the wind into the rotor assembly so as to optimize the efficiency of the wind turbine.

If the direction of the wind W changes, the outer shaft 24 rotates by virtue of vane assembly 32 to reorient the wind deflectors into the relative positions as illustrated.

In accordance with one aspect of the present invention, the wind deflectors 28 and 30 are connected to the outer shaft 24 of the wind turbine so that their positions are automatically adjusted as a function of wind velocity as well as a function of wind direction. As the wind speed increases from a first predetermined value to a second predetermined value, the two wind deflectors automatically move away from each other to enlarge the space between them to thereby direct greater amounts of air into the cups 20 of the rotor assembly. When the wind speed decreases, the wind deflectors return towards each other until they reach the normal position shown in FIG. 2. At the same time the connection of the wind deflectors to the outer shaft allows them to automatically move to a position fully downstream of the rotor assembly during periods of unusually high wind velocity in excess of a third predetermined value as best seen in FIG. 4. This creates a substantially dead air zone in the region of the rotor assembly which reduces wind speed and slows the rotation of the rotor assembly without completely stopping it. When the high wind condition abates, the two wind deflectors automatically return to their normal positions shown in FIGS. 1 and 2.

Referring to FIGS. 5-8, the outer shaft 24 has an upwardly facing circumferentially extending shoulder 52 formed therein which divides the outer shaft into lower larger diameter and upper smaller diameter portions. Referring to FIGS. 6 and 8, the shoulder 52 has a helical shoulder portion 54 which extends around approximately 200° to 220° of the circumference of shaft 24 sloping relatively gently upwardly from a point A to a point B, and an apex portion defined by a pair of apex shoulder portions 56 and 58 which slope relatively steeply upwardly from points A and B respectively meeting at an apex point C. Although the slopes of apex shoulder portions 56 and 58 are shown opposite and equal, it is understood that the slopes may differ in accordance with the invention. The shoulder 52 functions to support first and second circular segment connector rings 60 and 62 attached to the support arms 48 and 50 of the first and second wind deflectors 28 and 30, respectively. The connector rings connect the wind deflectors through their respective support arms to the outer shaft 24.

Connector ring 60 has a tapered configuration increasing in height from a short side edge 64 to long side edge 66. The bottom edge 68 of connector ring 60 slopes upwardly at the same angle as helical shoulder portion 54 while the top edge 70 of connector ring 60 slopes downwardly, i.e., in an opposite direction from bottom edge 68. Ball bearings are provided at the two side edges, the bottom edge and the inner surface of connector ring 60. The gap between the side edges 64 and 66 is such that when the connector ring 60 is positioned around the outer shaft 24 with its bottom edge 68 supported on helical shoulder portion 54 as seen in FIG. 6, the side edges 64 and 66 are substantially contiguous with the apex shoulder portions 58 and 56 respectively. It is also noted that the side edges 64 and 66 are themselves sloped to conform to the angle of slope of the respective contiguous apex shoulder portions 58 and 56.

Second connector ring 62 also has a tapered configuration but in reverse to that of first connector ring 60. Thus, connector ring 62 increases in height from a short side edge 72 to a long side edge 74. The bottom edge 76 of connector ring 62 slopes downwardly at the same angle as the top edge 70 of first connector ring 60. Ball bearings are provided at the two side edges, the bottom edge and the inner surface of connector ring 62 as well as at a notched edge 92 thereof, discussed below. The gap between the side edges 72 and 74 is such that when the connector ring 62 is positioned around the outer shaft 24 with its bottom edge 76 supported on the top edge 70 of the first connector ring 60 as seen in FIG. 6, the short and long side edges 72 and 74 thereof are substantially contiguous with the apex shoulder portions 56 and 58 respectively. It is also noted that the side edges 72 and 74 are themselves sloped to conform to the angles of slope of the respective contiguous apex portions 56 and 58.

The first and second connector rings 60 and 62 secure the first and second wind deflectors 28 and 30 to the outer shaft 24. In normal operation and relatively moderate wind speeds, the first connector ring 60 is situated as shown in FIG. 6 with its bottom edge supported on the helical shoulder portion 54 while the second connector ring 62 rests upon the first connector ring 60 whereby the weight of the second deflector 30 and its connector ring 62 acts on the underlying first connector ring 60 to stabilize the same in view of the larger size of the first deflector 28. First and second connector rings 60 and 62 are normally prevented from rotating with respect to the outer shaft 24 by the apex shoulder portions 58 and 56 respectively. In particular, during normal operation, with the wind direction being designated by the arrows W in FIGS. 1, 2, 4, 6, 7 and 8, the outer shaft 24 is rotatably aligned in the proper direction under the action of the vane assembly 32. The connector rings 60 and 62 rotate with the outer shaft 24 so that the first and second wind deflectors attain the positions shown in FIGS. 1 and 2 wherein the wind is initially deflected by the first deflector 28 and redirected by the inner surface of second wind deflector 30 into cups 20 so that the wind deflectors together act to optimize the efficiency of the wind turbine as described above.

In the case where the wind velocity increases beyond a certain first predetermined value (and is still below a certain maximum third predetermined value indicative of unusually high wind conditions), the positions of the wind deflectors will automatically be adjusted to enlarge the space between them to thereby direct greater amounts of air into the cups 20. In particular, as the wind velocity increases, the forces acting on the wind deflectors correspondingly increase to increase the opposite torques acting on the respective connecting rings. The connecting rings are therefore urged in opposite rotational directions on outer shaft 24. Referring to FIG. 6, the short side edge 64 of the first connecting ring 60 is urged against the apex shoulder portion 58 while the short side edge 72 of the second connecting ring 62 is urged against the apex shoulder portion 56. When the wind velocity exceeds the first predetermined value and increases up to a second predetermined value, the connecting rings begin to "climb" on the respective apex shoulder portions thereby allowing the respective wind deflectors to rotate with respect to the outer shaft to enlarge the space between them to maximize the efficiency of the wind turbine as described above. When the high wind condition abates, the connecting rings fall back to their normal positions shown in FIG. 6 so that the wind deflectors automatically return to their normal positions shown in FIGS. 1 and 2.

According to another feature of the invention, the wind deflectors will automatically move to positions downwind of the rotor assembly as illustrated in FIG. 4 during periods of extremely high wind velocity, such as hurricanes or squalls. The first wind deflector 28 will thus rotate about 180° from its normal position shown in FIG. 2 to that shown in FIG. 4 while the second wind deflector 30 will rotate about 90° from its normal position shown in FIG. 2 to that shown in FIG. 4. In this connection, the apex point C of the apex portion of ridge 52 defined by the intersection of the apex shoulder portions 56 and 58 is preferably located at about a 90° angle from the leading edge of the vane 34 on the side of outer shaft 24 at which the first wind deflector 28 is normally positioned since the apex must be situated midway of the arc of swing of the first wind deflector 28 in order to properly function as described below.

In operation under extremely high wind conditions, the wind deflectors begin to move in opposite directions as the respective first and second connecting rings 60 and 62 "climb" the respective apex shoulder portions 58 and 56. Eventually, the rings reach the top of the apex portion whereupon the first connector ring 60 rides on its bottom edge 68 on the apex point C with the second connector ring 62 still supported on the top edge 70 of connector ring 60 as best seen in FIG. 8. First connector ring 60 is provided with a first angled stop member 80 and second connector ring 62 is provided with a second angled stop and lift member 82 as best seen in FIGS. 5 and 8. A fixed stop member 84 projects outwardly from the apex point C of outer shaft 24. When the connector rings 60 and 62 reach the positions shown in FIG. 8, their further rotation is prevented by engagement of the stop member 80 and stop and lift member 82. In particular, the rotation of first connector ring 60 is terminated when the first angle stop member 80 engages the fixed stop member 84. Rotation of the second connector ring 62 is terminated when the second stop and lift member 82 engages a roller 132 which is part of a rotational governor system, described below. When the connector rings are situated in the positions shown in FIG. 8, the wind deflectors will be situated as shown in FIG. 4 to form the dead air zone downwind of rotor assembly 12 as described above. When the high wind condition abates the first connector ring 60 will rotate under the force of gravity on its sloped bottom edge 68 while the second connector ring 62 will begin to rotate in the opposite direction under the force of gravity riding on its bottom edge 76. Rotation of these rings will continue until they fall to the positions illustrated in FIG. 6 whereupon the wind deflectors assume their original normal positions shown in FIGS. 1 and 2.

Substantially S-shaped reverse slanted small airfoils 86 and 88 are permanently affixed to the first wind deflector 28 as seen in FIGS. 1, 2 and 4. These airfoils have a dual purpose. Firstly, wind directed against the small airfoils 86 and 88 produce a force which acts substantially opposite to the forces which result when the wind hits the surface 28a to thereby facilitate the stabilization of the first wind deflector. Secondly, the small airfoils insure that the wind deflector will move to its more rearward position (FIG. 4) during high wind conditions by creating additional pressure acting in a rearward or downwind direction.

The first connector ring 60 is preferably notched at 90 (FIG. 5) while the second connector ring 62 is notched at 92. The notches facilitate the descent of the connector rings from their maximum apex positions in that they prevent interference between the rings during their opposite downward descent and rotation as well as during their upward rotational movement.

In order to protect the various moving elements and bearings which are exposed to the environment, the wind turbine is provided with various weather boots or skirts 94, 96, 98 and 100 (FIG. 1). As best seen in FIG. 10, boot 100 is fixed to and encloses the lowermost portion of the outer shaft 24 and cooperates with an upstanding sleeve 102 fixed at its lower end to platform 16 to protect the bearings 27 from the environment. Weather boot 98 is fixed to the outer shaft 24 and encloses the portion of shaft 24 on which the connector rings 60 and 62 are situated to protect the rings and bearings from adverse weather conditions. Weather boot 94 is fixed to hub 22 (FIG. 3) and encloses the same to protect the bearings. Moreover, weather boot 94 which rotates with hub 22 serves to rotatably drive a rotational governor system described below. Finally, weather boot 96 including sector 140 is fixed to outer shaft 24 and encloses mechanisms forming part of the rotational governor system to protect the same from adverse weather conditions.

As noted above, during very high wind velocity conditions the wind deflectors 28 and 30 move to the downwind position shown in FIG. 4 tending to slow the rotational speed of the rotor by creating a dead air zone in the region of the rotor. In accordance with another feature of the present invention the wind turbine is provided with a rotational governor system for increasing the angular inertia of the turbine to further limit the rotational speed of the turbine shaft when such high wind velocity conditions are encountered. The rotational governor system is actuated by the movement of the wind deflectors to their downwind positions and, more particularly by the rotation of the respective connector rings 60 and 62 to their apex positions shown in FIG. 8.

Referring to FIG. 9, a first gear 102 is mounted on outer shaft 24 so that a sector thereof passes through a slot 104 formed in the wall of the outer shaft to extend into the interior thereof. An internally toothed gear ring 106 is fixed to the weather boot 94 by arms 108 so that the teeth of gear ring 106 mesh with those of first gear 102. A pair of second gears 110 are mounted on the outer shaft 24 below the first gea 102 at diametrically opposed positions and extend through respective slots 112 into the interior of outer shaft 24. A second internally toothed gear ring 114 is mounted on outer shaft 24 by brackets 116 so as to be rotatable, the teeth of the second gear ring 114 meshing with those of gear 110. A plurality of hangers 118 (one shown) are fixed to the gear ring 114 from which weighted rods 120 are suspended.

A transmission rod 122 is mounted within outer shaft 24 extending through openings formed in interior brackets 124. Stops 126 are fixed to the ends of transmission rod 122. A pair of transmission gears 128 and 130 are fixed to rod 122 spaced from each other a distance equal to the spacing between the respective horizontal planes in which the first gear 102 and second gears 110 are located. A roller 132 is rotatably mounted on a bracket 134 which extends through an elongated slot 136 formed in the wall of outer shaft 24, bracket 134 being axially fixed to transmission rod 122 by collets 150 in a manner to allow rod 122 to rotate.

During normal operation of the wind turbine, the transmission rod is in the position shown in phantom in FIG. 9 with transmission gears 128 and 130 being in their lower positions, also shown in phantom. As described above, when a very high wind velocity condition exists, the connector rings 60 and 62 attain the position illustrated in FIG. 8. In attaining this position, the upper second connector ring 62 engages the roller 132 along its top, sloped edge 138 and as connector ring 62 rotates, the roller 132 is elevated within slot 136 in turn elevating the transmission rod 122 until transmission gears 128 and 130 engage first and second gears 102 and 110 respectively. The rotation of weather boot 94 is transmitted through gear ring 106, first gear 102 and transmission gear 128 to the transmission rod 122 to rotate the latter. Rotation of transmission rod 122 is transmitted through transmission gear 130 to the second gear ring 114 through transmission gear 130 and second gear 110. By virtue of the rotation of the second gear ring 114, the weighted rods 120 also rotate whereupon they swing to the phantom position illustrated in FIG. 9 to increase the angular inertia of the turbine shaft to slow the rotational speed thereof. When the high wind velocity condition abates, the connector rings return to their normal position as described above whereupon the transmission rod 122 descends to disengage the transmission gears 128 and 130 from first and second gears 102 and 110 whereupon rotation of the second gear ring 114 ceases.

In order to assist the weighted rods 120 in the reduction of the rotational speed of the turbine shaft, a sector 140 of weather boot 96 is removed as best seen in FIG. 9. When the weighted rods are in the phantom position during a high wind velocity condition, the oncoming wind impinges upon the weighted rods and also creates a tunnelling effect so that wind currents are directed through the side of the boot 96 through sector 140 opposing the rotation of the weighted rods 120. This creates resistance to rotation of the second ring 114 and, therefore, to the rotation of the turbine drive shaft. The sector 140 is formed in the side of boot 96 substantially 90° from the leading edge of vane 34 and at that side at which incoming wind will be directed in a cross-current and opposite direction with respect to the rotation of the weighted rods 120.

Referring to FIG. 11, a typical relationship between wind speed and the rotational speed of a wind turbine according to the invention is graphically illustrated As wind speed increases from zero to a first predetermined value, e.g., about 24.9 mph, the rotational speed of the turbine linearly increases as shown by segment O-A. At wind speeds in this range the wind deflectors remain stationary in their normal positions as shown in FIGS. 1 and 2.

As the wind speed increases beyond the first predetermined value to a second predetermined value (e.g. from 25.1 to 34.4 mph) as shown by segment A-B, the wind deflectors move relative to each other to increase the inter-deflector spacing and assume a certain constant position at a constant wind speed in this range. The deflectors eventually obtain their maximum downwind positions (FIG. 4) as the wind speed increases to about 34.4 mph and a dead air zone is created in front of the deflectors.

Immediately following the deflectors reaching their maximum downwind positions, the rotational governor is engaged as described above. As the wind speed increases to a maximum third predetermined value (e.g. about 34.5 mph) as shown by segment B-C, the barbells pivot outwardly until reaching their maximum outwardly extended positions. The rotational speed of the turbine will increase only slightly as the wind speed exceeds the third predetermined value as indicated by segment C-D.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A wind turbine, comprising:
   a vertical axis rotor assembly coupled to a rotatable drive shaft for driving electrical power generating means;
   first wind deflector means mounted on said wind turbine normally positioned generally upwind and to one side of said rotor assembly for initially deflecting wind current into said rotor assembly and second wind deflector means mounted on said wind turbine normally positioned on another side of said rotor assembly to redirect the initially deflected wind current into said rotor assembly, said first and second wind deflector means normally spaced from each other by a certain inter-deflector spacing;
   mounting means for mounting said first and second wind deflector aeans in said normal positions, said mounting means including an outer shaft through which said drive shaft extends and which is normally fixed with respect thereto, said outer shaft having an upwardly facing circumferentially extending shoulder formed therein including a first shoulder portion extending around a major portion of the circumference of said outer shaft and a pair of upwardly sloping apex shoulder portions which reet at an apex, first and second circular segment connector rings coupled to said first and second wind deflector means respectively, said first connector ring having top, bottom and a pair of side edges, said side edges forming a gap between them, said first connector ring being mounted on said first shoulder portion with said bottom edge normally supported on said first shoulder portion with said side edges contiguous with respective apex shoulder portions, said second connector ring having top, bottom and a pair of side edges, said side edges forming a gap between them, said second connector ring being mounted on said top edge of said first connector ring with said side edges contiguous with respective apex shoulder portions, said mounting means allowing at least one of said first and second wind deflector means to automatically move relative to each other and from its respective normal position when the velocity of the wind current exceeds a first predetermined value to increase said inter-deflector spacing and for allowing said at least one first and second wind delfector means to automatically return to its respective normal position when the velocity of the wind current diminshes to a value below said first predetermined value; and
   vane means for rotating said first and second wind deflector means together as a unit upon a change in direction of the wind current while maintaining said normal positions thereof.

2. The combination of claim 1 wherein said top and bottom edges of said first connector ring are sloped with respect to the horizontal in opposite directions so that said first connector ring is tapered, and wherein said second connector ring is tapered in an opposite direction from said first connector ring.

3. The combination of claim 1 wherein said mounting means further comprise means for allowing said first and second wind deflector means to automatically move relative to each other and from their respective normal positions to positions downwind of said rotor assembly when the velocity of the wind exceeds a second predetermined value which is greater than the first predetermined value whereby a substantially dead air zone is created in the region of said rotor assembly.

4. The combination of claim: 1 wherein said top and bottom edges of said first connector ring are sloped with respect to the horizontal in opposite directions so that said first connector ring is tapered and wherein said second connector ring is tapered in an opposite direction from said first connector ring.

5. The combination of claim 4 further including rotational governor means for increasing the angular inertia of the rotor assembly.

6. The combination of claim 5 further including means for actuating said rotational governor means when the velocity of the wind current exceeds said second predetermined value.

7. The combination of claim 6, wherein said rotational governor means include a first gear ring coupled to said rotor assembly for continuous rotation therewith, a second gear ring to which weighted members are coupled, said second gear ring being rotatably mounted on said outer shaft, gear transmission rod means mounted within said outer shaft for reciprocating movement between a first normal position wherein said first and second gear rings are disengaged from each other and a second position wherein said transmission rod means couples said first and second gear rings to each other, and means for moving said transmission rod means from said first to said second position when the velocity of the wind current exceeds said second predetermined value.

8. A combination of claim 7 wherein said means for moving said transmission rod means include cam means affixed to said transmission rod means adapted to be engaged by the top edge of said second connector ring when the wind current exceeds said second predetermined value.

9. The combination of claim 1 further including rotational governor means for increasing the angular inertia of the rotor assembly and wherein said rotational governor means include a first gear ring coupled to said rotor assembly for continuous rotation therewith, a second gear ring to which weighted members are coupled, said second gear ring being rotatably mounted on said outer shaft, gear transmission rod means mounted within said outer shaft for reciprocating movement between a first normal position wherein said first and second gear rings are disengaged from each other and a second position wherein said transmission rod means couples said first and second gear rings to each other, and means for moving said transmission rod means from said first to said second position when the velocity of the wind current exceeds said second predetermined value 10. The combination of claim 7 further including first weather boot means covering said first gear ring and affixed to said rotor assembly for rotation therewith, and means connecting said first weather boot means to said first gear ring for rotatably coupling said first gear ring and said rotor assembly.

11. The combination of claim 10 further including second weather boot means covering said second gear ring and wherein a sector of said second weather boot means is removed to create a wind tunneling effect therein which creates further resistance to rotation of said second gear ring.

12. A wind turbine, comprising:
a vertical axis rotor assembly coupled to a rotatable drive shaft for driving electrical power generating means;
first wind deflector means mounted on said wind turbine normally positioned generally upwind to one side of said rotor assembly for initially deflecting wind current into said rotor assembly and second wind deflector means mounted on said wind turbine normally positioned on another side of said rotor assembly to redirect the initially deflected wind current into said rotor assembly, said first and seeond wind deflector means normally spaced from each other by a certain inter-deflector spacing;
mounting means for mounting said first and second wind deflector means in said normal position;
vane means for rotating said first and second wind deflector means together as a unit upon a change in direction of the wind current while maintaining said normal positions thereof;
rotational governor means for increasing the angular inertia of the rotor assembly, said rotational governor means including a first gear ring coupled to said rotor assembly for continuous rotation therewith, a second gear ring to which weighted members are coupled, said second gear ring being rotatably mounted on said wind turbine, gear transmission rod means mounted on said wind turbine for reciprocating movement between a first normal position wherein said first and second gear rings are disengaged from each other and a second position wherein said transmission rod means couples said first and second gear rings to each other, and means for moving said transmission rod means from said first to said second position when the velocity of the wind current exceeds a predetermined value;
first weather boot means covering said first gear ring and affixed to said rotor assembly for rotation therewith, and means connecting said first weather boot means to said first gear ring for rotatably coupling said first gear ring and said rotor assembly; and
second weather boot means covering said second gear ring and wherein a sector of said second weather boot means is removed to create a wind tunneling effect therein which creates further resistance to rotation of said second gear ring.

* * * * *